Sept. 2, 1952     H. R. SOMMA ET AL     2,608,764
SCRIBING AND INSPECTING GAUGE FOR CIRCULAR FORM TOOLS
Filed Aug. 1, 1949
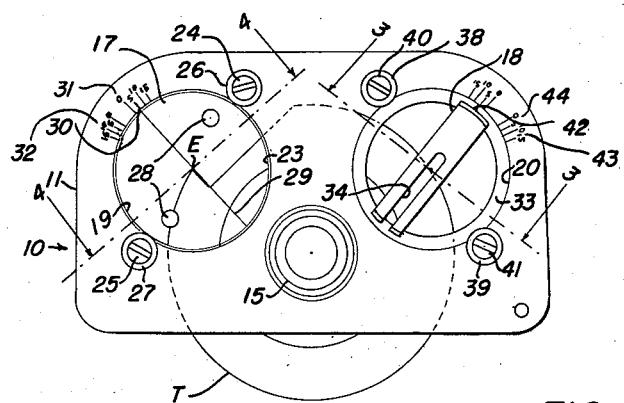
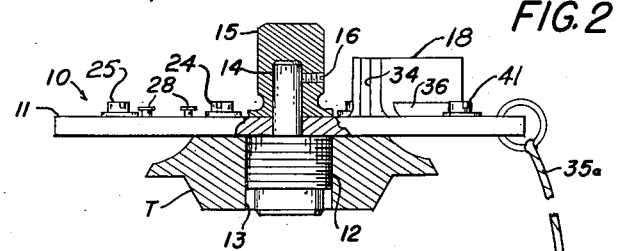
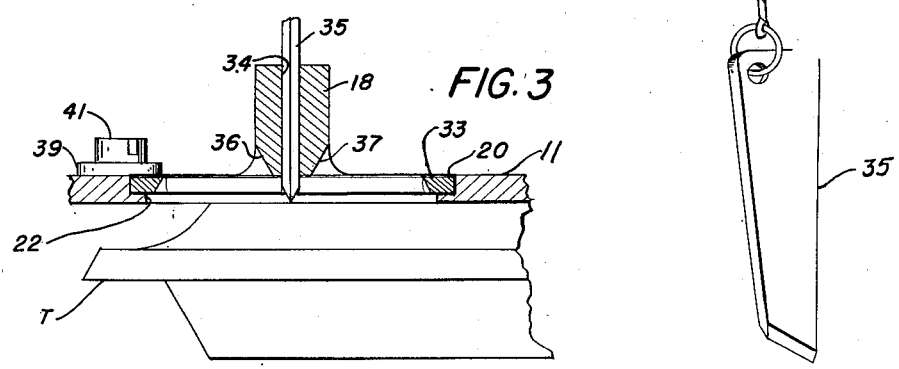
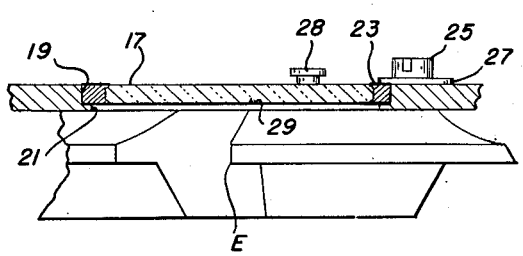
INVENTORS:
HERMAN R. SOMMA
HENRY J. SOMMA
BY H. G. Manning
ATTY.

Patented Sept. 2, 1952

2,608,764

UNITED STATES PATENT OFFICE 2,608,764

SCRIBING AND INSPECTING GAUGE FOR CIRCULAR FORM TOOLS

Herman R. Somma and Henry J. Somma, Waterbury, Conn., assignors to The Somma Tool Company, Waterbury, Conn., a corporation of Connecticut Application August 1, 1949, Serial No. 107,886

6 Claims. (Cl. 33—32)

This invention relates to gauges, and more particularly to a scribing and inspection gauge which will facilitate the provision of accurate cutting edges upon circular form tools of the type employed for shaping the work in automatic screw machines.

One object of the invention is to provide a gauge of the above nature having a scriber guide which will enable the cutting surface to be accurately laid out at a zero or other rake angle on the tool without regard to the specific peripheral form of the tool.

Another object is to provide a gauge of the above nature having a turnable scriber guide which is readily adjustable for selectively laying out either standard or other cutting surfaces.

Another object is to provide a gauge of the above nature which is provided with an adjustable inspecting disk which may be employed to determine the rake angle of the cutting surface in a form tool without disturbing the adjustment of the scriber guide.

Another object is to provide a device of the above nature in which the scriber guide is so constructed as to permit direct observation of the form tool during the scribing operation.

A further object is to provide a gauge of the above nature which will be simple in construction, inexpensive to manufacture, easy to use and manipulate, compact, ornamental in appearance, and very efficient and durable in use.

With these and other objects in view, there has been illustrated on the accompanying drawing one form in which the invention may conveniently be embodied in practice.

In the drawing,

Fig. 1 is a plan view of the improved scribing and inspection gauge showing a form tool secured thereto in position for inspection.

Fig. 2 is a front elevation of the same, partly in section, showing a scriber attached thereto by a cord.

Fig. 3 is a partial cross sectional view, showing the scriber guide on an enlarged scale, taken on the line 3—3 of Fig. 1, and with the scriber in operating position.

Fig. 4 is a partial cross sectional view, taken on the line 4—4 of Fig. 1, showing the inspecting disk on an enlarged scale.

Referring now to the drawings, in which like reference numerals denote corresponding parts throughout the several views, the numeral 10 indicates one form of the improved gauge comprising a flat base plate 11, of stainless steel or other suitable material, and generally rectangular in form but preferably rounded at its corners to facilitate handling.

A circular form tool T (which is adapted to be provided with a cutting edge E) may be held firmly against the lower surface of the base plate 11 by means of a threaded plug 12 which is adapted to be engaged in a tapped central aperture 13 in said form tool. The plug 12 is provided with a reduced stud 14 rotatably disposed in an aperture offset from the center of the base plate 11, said stud having a knob 15 held thereon by a set screw 16. Thus, it will be seen that the form tool T may be applied to the plug 12 and brought into firm clamping engagement with the lower surface of the base plate 11 by manual rotation of the knob 15.

It will be noted, however, that a slight reverse turning movement of the knob 15 and the plug 12 will serve to loosen the tool T so as to permit its rotation with respect to the base plate 11 for a purpose to be described hereinafter.

In order to hold an inspection disk 17 and a scriber guide 18 for rotary adjustment, opposite end portions of the base plate 11 are respectively formed with large circular apertures 19, 20 having narrow inwardly-extending lower flanges 21, 22—said apertures 19, 20 being disposed with their centers in accurate vertical alignment with the outer periphery of the form tool T.

The inspecting disk 17 is formed of a suitable flat transparent material which will permit visual observation of the form tool T therethrough, and is provided with a peripheral ring or bezel 23 which may be crimped or otherwise firmly attached to the edges of said transparent disk, whereby the inspection disk 17 is rotatably mounted upon the flange 21.

In order to hold the disk 17 within the aperture 19, and also to frictionally resist rotation thereof, provision is made of a pair of retaining screws 24, 25, which are diametrically opposed to each other and which are mounted in the base plate 11. The retaining screws 24, 25 are provided with washers 26, 27 which overlap the ring 23, said ring being of such a thickness as to project slightly above the upper surface of the plate 11. Thus, the washers 26, 27 frictionally engage edge portions of the inspecting disk 17 and will permit said disk to be rotated when desired by the operator, provision being made of a pair of integral upwardly projecting handles 28, for this purpose.

In order to permit the rake angle of the cutting edge E to be determined, the lower surface of the inspecting disk 17 is provided with a diametrical hair line 29, and an index mark 30 is provided in the upper surface of the ring 23 in alignment with said hair line.

Rake angles in the tool T may be determined by the hair line 29 and the index mark 30 in conjunction with either of two sets of numbered graduations 31, 32, respectively, which are so arranged that the zero graduation in each set will indicate a desired standard offset of the cutting surface from a radial plane of the tool.

The scriber guide 18 is in the form of a bar which is held in a diametric position above the aperture 20 by means of an integral ring 33 supported upon the flange 22. The scriber guide 18 is provided with a longitudinal vertical slot 34 which is accurately aligned with a diameter of the aperture 20, and which is cut inwardly through the ring 33 at one end of the scriber guide 18, but which terminates short of the opposite end of said guide.

It will be seen that the slot 34 is parallel-sided, and has a vertical depth which is much greater than its width, said depth preferably being at least four times the width of the slot 34 in order to accurately guide a flat, pointed scriber 35 which has a snug sliding fit in said slot.

Thus, it will be seen that the scriber 35 will be accurately guided in the slot 34 when used to scribe a line upon the tool T. It will also be seen that the scriber guide 18 is relatively narrow as compared with the diameter of the ring 33, and that said guide has lower converging bevelled side portions 36, 37 which permit the lower end of the scriber 35 to be clearly visible to the operator during the scribing operation, so as to facilitate the use thereof.

In order to retain the scriber guide ring 33 frictionally against the flange 22 of the aperture 20, provision is made of a pair of washers 38, 39, which overlap the ring 33, and are held by means of retaining screws 40, 41, mounted in the base plate 11. The thickness of the ring 33 is such as to cause said ring to project slightly above the upper surface of the base plate 11 so that said ring will be positively engaged by the washers 38, 39, and thus frictionally held against accidental turning in the aperture 20.

The ring 33 is provided with an index mark 42 which is aligned with the slot 34 so as to accurately indicate a standard offset or degree of rake angle upon either of two numbered sets of graduations 43, 44 marked upon the base plate 11.

The scriber 35 is preferably attached to the base plate 11 by means of a chain or cord 35a, so that the gauge 10 will always be accompanied by the scriber and the latter cannot become lost.

The gauge 10 may, of course, be made in any desired size in order to accommodate different standard sizes of form tools, as for example, the types and sizes which are known as No. 00 B&S, No. 0 B&S, and No. 2 B&S. It will be understood that, in each instance, the threaded plug 12 will be so constructed as to properly fit the central aperture of each particular size of form tool, while the base plate 11 will be so constructed that the centers of the apertures 19, 20 will be disposed at the periphery of the form tool T.

*Operation*

Assuming that it is desired to ascertain the position or angle of the cutting surface of a circular form tool T, said tool will be loosely attached to the threaded plug 12, and then turned until the cutting edge E is disposed in alignment with the center point of the hair line 29, after which the knob 15 will be tightened so as to clamp the tool T firmly against movement.

The inspection disk 17 will then be manually rotated by means of the projections 28 until the hair line 29 coincides with the cutting surface of the tool T, whereupon the position of the cutting surface will be indicated by the position of the index mark 30 adjacent the graduations 31 or 32, as the case may be.

It it should now be desired to scribe the locations of a new or different cutting surface upon the tool T, in order to facilitate the grinding of a new cutting edge, the knob 15 will be loosened so as to permit said tool to be rotated. The location of the desired cutting edge upon the periphery of the tool T will, of course, be centered under the slot 34, whereupon the knob 15 will be turned to clamp the tool T and prevent its further movement.

The scriber guide 18 will then be grasped and turned so as to bring the index mark 42 opposite the desired offset or rake angle as indicated by the graduations 43 or 44.

The scriber 35 will then be inserted downwardly through the slot 34 and drawn longitudinally in said slot in such a manner that the point of the scriber 35 will scratch a line in a coating of Prussian blue or other suitable compound which will have been previously applied to the tool T, thus providing a clear mark thereon which will facilitate the grinding of the tool at the proper location and angle.

It will, of course, be understood that the tool T will be removed from the gauge 10 prior to the grinding operation, the removal being accomplished merely by turning the knob 15 in a counterclockwise direction.

One advantage of the gauge herein disclosed, is that the relatively great depth of the scriber guide slot 34 will permit cutting surfaces to be accurately marked upon tools having irregular or complicated edge configurations, inasmuch as the scriber 35, when in use, will always be maintained in a plane at right angles to the side surface of the tool T.

While there has been disclosed in this specification one form in which the invention may be embodied, it is to be understood that this form is shown for the purpose of illustration only, and that the invention is not to be limited to the specific disclosure, but may be modified and embodied in various other forms, without departing from its spirit. In short, the invention includes all the modifications and embodiments coming within the scope of the following claims.

Having thus fully described the invention, what is claimed as new, and for which it is desired to secure Letters Patent, is:

1. In a gauge for circular form tools, a base plate having means for clamping a form tool of predetermined diameter against one face thereof, a circular aperture in said plate, the center of said aperture being located in alignment with a point on the periphery of the form tool held by said clamping means, and a scriber guide rotatably mounted in said aperture, said scriber guide comprising a slotted bar which is held in a diametrical position adjacent said aperture by means of a ring mounted for rotating movement in said aperture.

2. The invention as defined in claim 1, wherein said ring is supported upon an inwardly-extending flange in said aperture, and including frictional means mounted upon said plate for retaining said ring against said flange.

3. The invention as defined in claim 1, wherein said bar is offset above said ring in a direction perpendicular to the plane of said ring, whereby the scratching action of a scriber in said slot may be observed by the operator.

4. In a gauge for a circular form tool, a base plate having means for clamping the form tool against one face thereof, a circular support member rotatably mounted in a through aperture within said base plate, and a scriber guide integrally affixed diagonally across said support member and perpendicularly offset from the plane of said face, said scriber guide having a slot in a plane at right angles to said face, said slot having a depth greater than the width thereof, whereby a scriber may be accurately guided by said slot.

5. The invention as defined in claim 1, wherein said clamping means comprises a threaded plug adapted to be received in a tapped central aperture in a form tool, a stud integral with said plug and extending rotatably through an aperture in said base plate, and a knob secured to said stud in abutting relationship with the opposite face of said base plate.

6. In a gauge for circular screw machine form tools, a substantially rectangular base plate having means for clamping a screw machine form tool of predetermined diameter against one face of said base plate, said base plate having a closed circular aperture the center of which is located in alignment with a point on the periphery of the screw machine form tool held by said clamping means, and a circular member rotatably mounted in said closed circular aperture, said member having means for facilitating the production of an accurate cutting edge on said screw machine form tool.

HERMAN R. SOMMA.
HENRY J. SOMMA.

REFERENCES CITED

The following references are of record in the file of this patent:

UNITED STATES PATENTS

| Number | Name | Date |
| --- | --- | --- |
| 773,896 | Richards | Nov. 1, 1904 |
| 919,786 | Simmons | Apr. 27, 1909 |
| 1,553,878 | Romig | Sept. 15, 1925 |
| 2,402,890 | Hochreiter | June 25, 1946 |